(12) United States Patent
Cheng et al.

(10) Patent No.: US 7,079,385 B1
(45) Date of Patent: Jul. 18, 2006

(54) DOCKING STATION LOCK AND ITS LINK ASSEMBLY

(75) Inventors: Yao-Kun Cheng, Taipei (TW); Chih-Chin Yu, Taipei (JP)

(73) Assignee: Inventec Corporation (TW)

( * ) Notice: Subject to any disclaimer, the term of this patent is extended or adjusted under 35 U.S.C. 154(b) by 0 days.

(21) Appl. No.: 11/022,855

(22) Filed: Dec. 28, 2004

(51) Int. Cl.
*G06F 1/16* (2006.01)
*E05B 73/00* (2006.01)
*F16M 13/00* (2006.01)

(52) U.S. Cl. .............................. 361/686; 70/58; 70/62; 248/553

(58) Field of Classification Search ................ 361/683, 361/686; 248/552, 553; D14/300, 434, D14/440
See application file for complete search history.

(56) References Cited

U.S. PATENT DOCUMENTS

| | | | |
|---|---|---|---|
| 5,692,400 A * | 12/1997 | Bliven et al. .................. | 70/58 |
| 5,805,412 A * | 9/1998 | Yanagisawa et al. ....... | 361/686 |
| 5,995,366 A * | 11/1999 | Howell et al. .............. | 361/686 |
| 5,997,323 A * | 12/1999 | Youn .......................... | 439/159 |
| 6,015,308 A * | 1/2000 | Lee et al. .................... | 439/155 |
| 6,047,572 A * | 4/2000 | Bliven et al. ................. | 70/58 |
| 6,053,756 A * | 4/2000 | Flanigan et al. ............ | 439/315 |
| 6,069,790 A * | 5/2000 | Howell et al. .............. | 361/686 |
| 6,275,378 B1 * | 8/2001 | Lee et al. .................... | 361/686 |
| 6,331,934 B1 * | 12/2001 | Helot et al. ................. | 361/686 |
| 6,565,163 B1 * | 5/2003 | Behl et al. ................ | 312/223.1 |
| 6,570,758 B1 * | 5/2003 | Maeda ........................ | 361/686 |
| 6,741,462 B1 * | 5/2004 | Kamphuis et al. .......... | 361/686 |
| 6,885,552 B1 * | 4/2005 | Mullen et al. .............. | 361/686 |
| 6,934,151 B1 * | 8/2005 | Nakano et al. ............. | 361/686 |

* cited by examiner

*Primary Examiner*—Lisa Lea-Edmonds
*Assistant Examiner*—Zachary Pape
(74) *Attorney, Agent, or Firm*—Bacon & Thomas PLLC

(57) ABSTRACT

The present invention discloses a docking station lock and its link assembly capable of fixing a cable onto the docking station as well as working jointly with another locking mechanism installed on a multibay to lock all installed peripherals to the docking station and prevent the docking station, the notebook computer and the peripherals from being taken away altogether.

2 Claims, 3 Drawing Sheets

DOCKING STATION LOCK AND ITS LINK ASSEMBLY

BACKGROUND OF THE INVENTION

1. Field of the Invention

The present invention is related to a docking station lock and its link assembly, more particularly to a docking station lock and its link assembly capable of locking a notebook computer to the docking station as well as providing a multi-locking effects for locking the notebook computer, the peripherals and the docking station as to prevent these equipments from being taken away or stolen.

2. Description of the Related Art

As the size of a notebook computer is limited, notebook computers cannot accommodate too many storage devices into the limited space provided, even for the so-called "all-in-one" model. In particular, the space for installing hard disk drives is very small. After a user has used a computer for a while, the quantity of data will become larger, it is necessary to install an additional hard disk drive or back up the data by a CD burner. Of course, data also can be transmitted via a local area network for the data processing, but it is not as convenient to process data directly with the computer.

Then, a user may use a multifunctional docking station designed for installing and removing the peripherals of a notebook computer. There are three main types of multifunctional docking stations: a basic model with lots of peripheral connection ports; an expanded model having a multibay installed on both sides of the docking station to facilitate the installation of additional peripherals besides the foregoing connection ports, so that the functions of a notebook computer can be expanded up a level equivalent to those of a desktop computer; and an external docking station model using a universal serial bus (USB) interface for connecting a notebook computer.

Further, the foregoing multibay can provide a more flexible way of storing data, and the peripherals connected to the multibay can expand the functions of the notebook computer, such as installing another detachable hard disk drive, CD burner, DVD-ROM, floppy disk drive, etc. or even installing additional batteries to improve the battery time or using a notebook computer as a commercial desktop computer.

A so-called "expandable mobile architecture" is a concept derived from the abovementioned principles emphasizing on the powerful expandability, so that users can expand the functions of their notebook computers as needed. The multibay which allows a hot plug connection for various different peripherals and integrates different platforms to meet different requirements makes the installation and removal of external devices to/from the notebook computer easy, and thus it is an excellent product to users.

The traditional multibay only has a lock hole on its housing for installing a lock as to secure the multibay at a fixed position and prevent other people to take away the multibay. However, the lock hole jointly working with the lock can only prevent the multibay from being taken away, and the design comes with no special locking mechanism to lock a notebook computer and other peripherals installed onto the multibay simultaneously. As a result, the notebook computer and other peripherals may be taken away or stolen very easily, which will cause a tremendous damage to the user. Therefore, finding a way for overcoming the foregoing shortcomings is definitely an important subject for manufacturers.

SUMMARY OF THE INVENTION

In view of the detailed description above, it is not difficult to observe that the structure of the lock hole installed on the multibay and the lock can only prevent the multibay from being taken away or stolen, but it cannot lock the installed notebook and other peripherals at the same time. As a result, the notebook computer and other peripherals can be taken away by others very easily, which will cause a tremendous damage to the users. Therefore, the inventor of the present invention based on years of experience of the related field to conduct extensive research and development to overcome the foregoing shortcomings and find a solution for the improvement, and finally invented a docking station lock and its link assembly in accordance with the present invention in hope of contributing such innovative idea to the public domain.

Therefore, it is a primary objective of the present invention to provide a docking station lock and its link assembly, which comprises a lock positioning groove at the bottom of the body of a docking station, a cable positioning groove, and a release button disposed adjacent to the lock positioning groove, such that a lock and a cable disposed on a side of the lock are coupled respectively and precisely with a lock and a cable disposed on a side of the lock, and one end of the cable is secured onto a wall or a fixed object such as a wall or a leg of a desk as to lock the docking station and prevent it from being taken away by others. A lock core of the lock is extended into the body of the docking station and works jointly with a link assembly to control a press-down movement of the release button and also simultaneously control two hooks installed on a side of a holder disposed on the body for locking and releasing the notebook computer as to prevent the notebook computer from being taken away.

Another objective of the present invention is to provide a docking station lock and its link assembly, wherein the docking station lock and its link assembly can also work jointly with other locking mechanism (such as a multibay lock mechanism), so that the lock also will drive another locking mechanism to lock a peripheral (such as an optical disk drive) which has installed said other lock, and thus provides a multi-locking effect.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
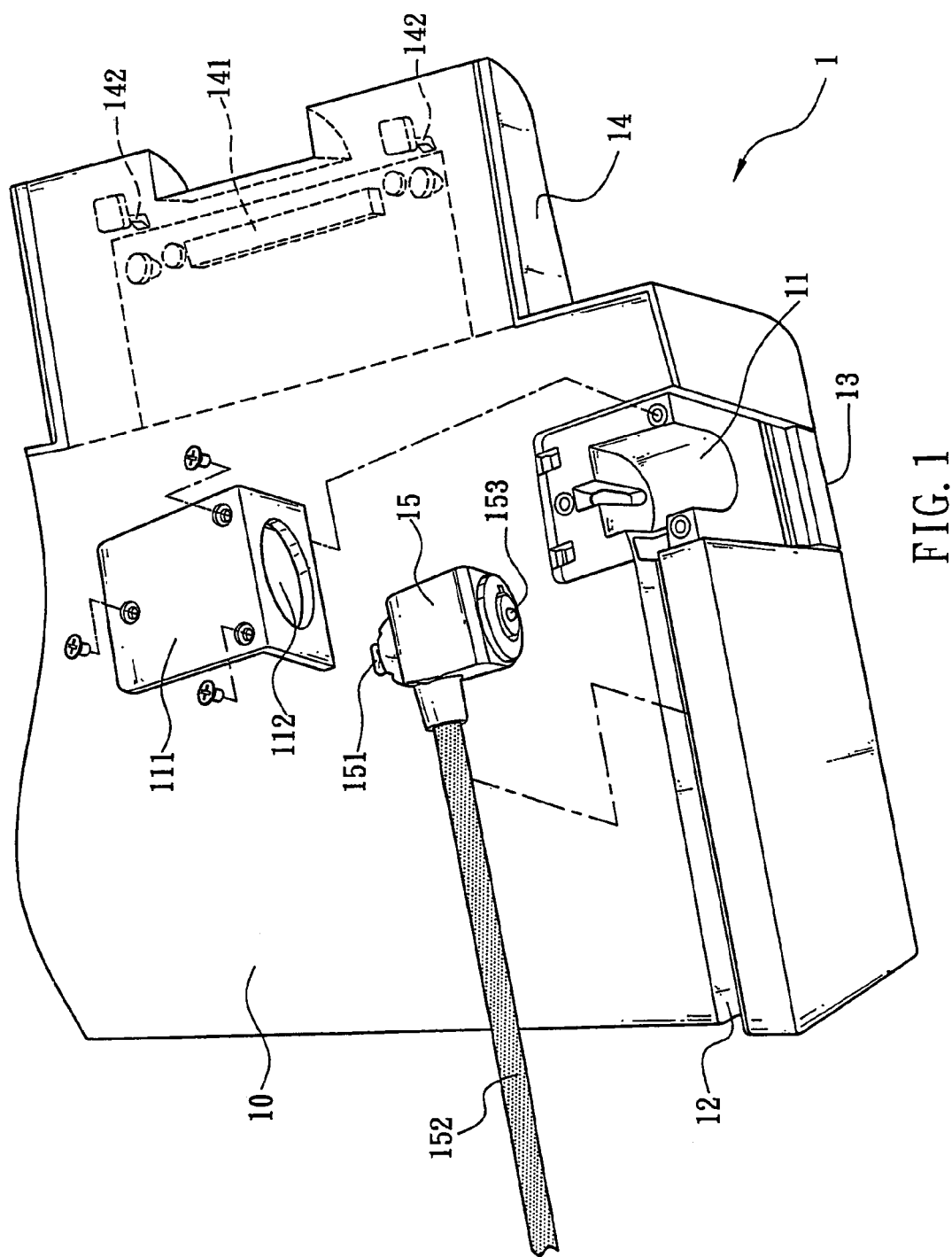
FIG. 1 is a schematic view of the bottom of a docking station and a lock according to the present invention.

Please refer to FIG. 1 for the docking station lock and its link assembly in accordance with the present invention. A docking station 1 is provided for installing a notebook computer (not shown in the figure) thereon, and the docking station 1 comprises a body 10, a lock positioning groove 11, a cable positioning groove 12 and a release button 13 disposed adjacent to the lock positioning groove 11, a holder 14 disposed on one side of the body 10, and a connector 141 and two hooks 142 disposed on the holder 14, such that the notebook computer can be engaged into the two hooks 142 and connected to the connector 141 when the notebook computer is installed onto the holder 14.

In the invention, the lock positioning groove 11 is provided for receiving a lock 15, and a lock core 151 of the lock 15 is extended into the body 10 to restrict the release button 13 from being pressed down, and a cable 152 is connected to a side of the lock 15 and the cable 152 can be fixed into the cable positioning groove 12 as to effectively manage the cable 152, and the other end of the cable 152 is fixed onto a fixed object (not shown in the figure) such as a wall or a leg of a desk, so that the notebook computer installed on the docking station 1 will not be taken away or stolen easily by others.

Figure 2:
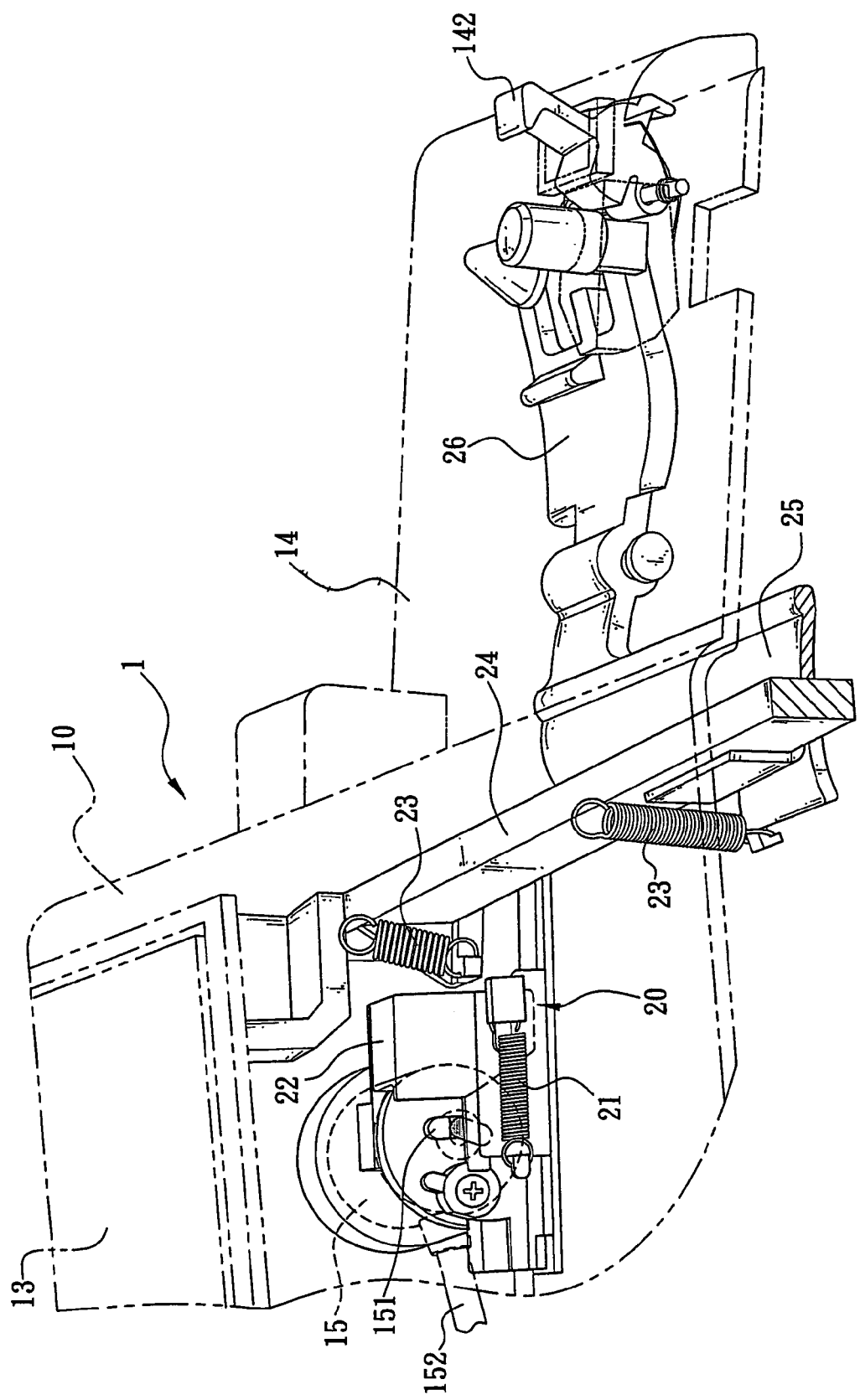
FIG. 2 is a schematic view of part of the docking station and the lock according to the present invention.

With reference to FIG. 2, the lock 15 works jointly with a link assembly 20 in the body 10 to control a press-down movement of the release button 13 and a movement of the two hooks on the holder 14, such that when the lock 15 locks the link assembly 20, the release button 13 cannot be pressed further to separate the two hooks 142 from the notebook computer installed on the holder 14 as to prevent the notebook computer from being taken away or stolen.

On the other hand, if the link assembly 20 is not locked by the lock 15, then the release button 13 can be pressed down to drive the link assembly 20 to release the two hooks 142 from the notebook installed onto the holder 14 and allow users to remove the notebook computer from the holder 14. In the meantime, the present invention also can prevent any damage caused by improper shaking of the devices by users during the connection and disconnection of the devices.

Please refer to FIG. 2. In the present invention, the link assembly 20 is installed at the lock core 151 of the lock 15 and has a sliding member 22 biased away from a position below said release button 13 by a first spring 21. The lock core 151 will push the sliding member 22 to position below the release button 13 if the lock 15 is turned to a locked position, so that the release button 13 cannot be pressed. A transversal rod 24 is connected to the bottom of the release button 13 and extends along the backside of the holder 14. At least one second spring 23 biases the transversal rod 24 upward, and the bottom of the transversal rod 24 is connected to a U-shape link rod 25. The front ends of two corresponding arms 26 of the link rod 25 precisely control the two hooks 142 to be turned outward. With the foregoing link assembly 20, the lock 15 locks the release button 13 to prevent the notebook computer from being taken away from the holder 14 after the notebook computer is installed onto the holder 14.

Figure 3:
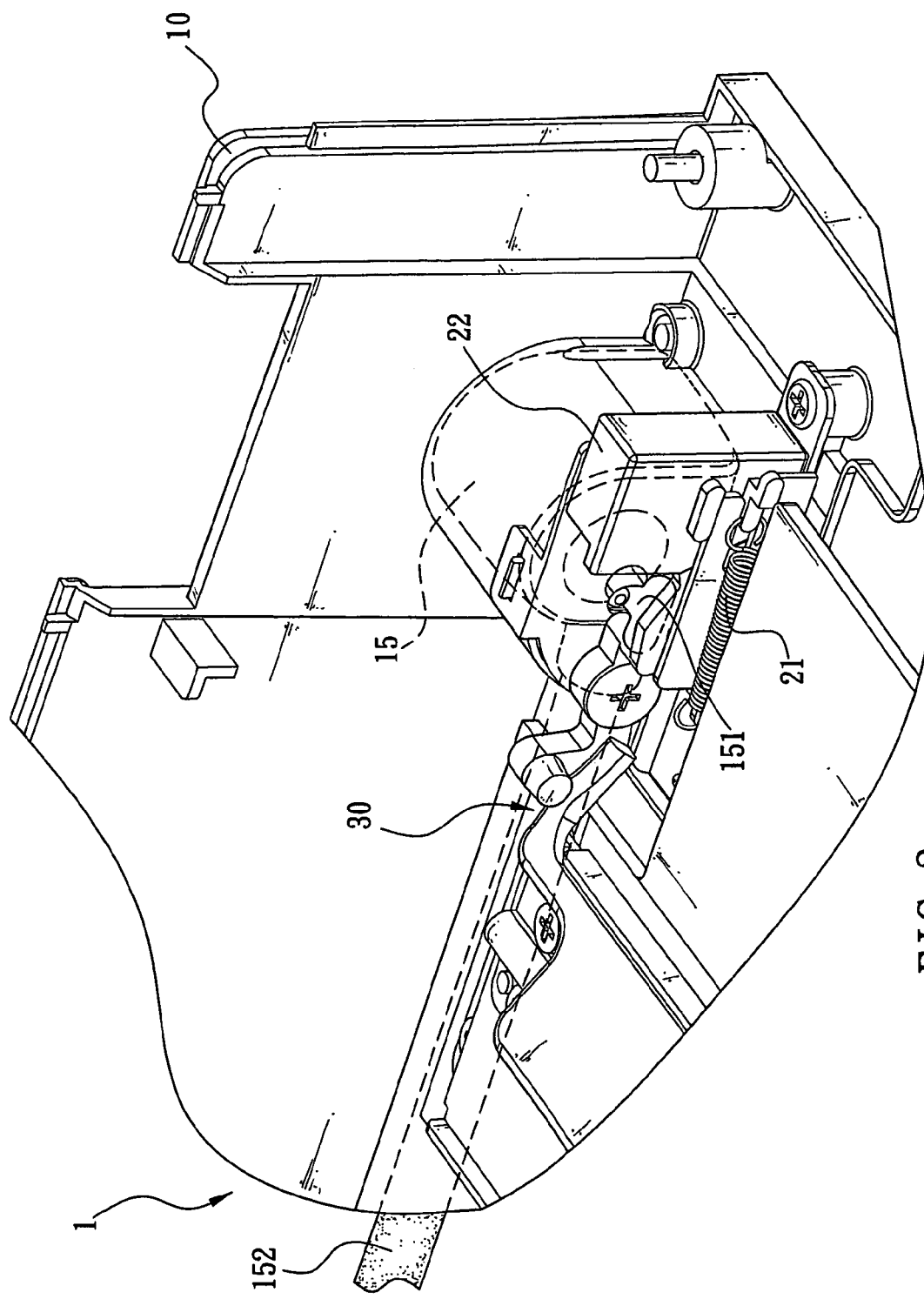
FIG. 3 is a schematic view of the lock of the docking station, its link assembly and another lock mechanism according to the present invention.

Please refer to FIG. 3. Besides locking the release button 13 on the body 10 of the docking station 1 as to lock the notebook computer to the holder and prevent it from being taken away, the present invention also uses the link assembly 20 to jointly work with another locking mechanism 30 (such as the locking mechanism 30 on a multibay) as to drive said other locking mechanism 30 to lock a peripheral (such as an optical disk, which is not shown in the figure) after the lock 15 is locked. Therefore, the present invention achieves a multi-locking effect of preventing the docking station 1, the notebook computer, or both from being taken away.

Please refer to FIG. 1. In the present invention, the lock positioning groove 11 further comprises a lock cover 111 being flatly secured onto the lock positioning groove 11, and the lock cover 111 has a through hole 112 for exposing a lock hole (or key hole) 153 of the lock 15 at the position of the through hole 12, such that the lock cover 111 can secure the lock 15 onto the lock positioning groove 11.

In view of the description above, the lock 15 and its link assembly 20 of the present invention is capable of fixing the cable 152 of the lock 15 onto the docking station 1 as well as working jointly with another locking mechanism 30 installed on a multibay to lock all peripherals to the docking station 1 and prevent the docking station 1, the notebook computer and the peripherals from being taken away altogether.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A docking station lock and its link assembly, and said docking station comprising:

a body, at its bottom having a lock positioning groove, a cable positioning groove, a release button disposed adjacent to said lock positioning groove, a holder protruded from a side of said body, and a connector and two hooks disposed on said holder for installing a notebook computer thereon;

a lock being installed precisely into said lock positioning groove and having a lock core being extended inside said body for restricting said release button from being pressed down, and a cable being disposed on a side of said lock and fixed into said cable positioning groove, and the other end of said cable being adapted to be fixed onto a fixed object;

a link assembly, being disposed at said lock core in said body of said lock, and working jointly with said lock to control a press-down movement of said release button and a movement of said two hooks on said holder, such that when said lock locks said link assembly, said release button cannot be pressed down to operate said link assembly to separate said two hooks from said notebook computer installed onto said holder;

wherein said link assembly comprises a sliding member, being biased by a first spring away from a position below the bottom of said release button and movable into said position below the bottom of said release button by said lock core to prevent said release button from being pressed down when said lock is turned to a lock position;

a transversal rod, being coupled to the bottom of said release button and extending along the backside of said holder and biased upward by at least one second spring; and a U-shape link rod, being coupled to the bottom of said transversal rod and the front end of two corresponding arms of said link rod controlling said two hooks from being turned outward; and wherein another locking mechanism is installed on said body of said docking station and coupled to said link assembly to lock a peripheral equipment installed thereon after said lock is locked.

2. The docking station and its link assembly of claim 1, wherein said lock positioning groove has a lock cover precisely and flatly attached thereon, and said lock cover has a through hole for exposing a key hole of said lock at said through hole as to secure said lock into said lock positioning groove.

* * * * *